United States Patent [19]
Sassmannshausen et al.

[11] Patent Number: 5,509,629
[45] Date of Patent: Apr. 23, 1996

[54] STAND

[75] Inventors: Werner Sassmannshausen, Bad Berleburg-Wingeshausen; Karl-Heinz Menzel, Bad Berleburg-Aue; Anke Kleindienst, Bad Berleburg, all of Germany

[73] Assignee: Sonor Johs. Link GmbH, Bad Berleburg, Germany

[21] Appl. No.: 369,527

[22] Filed: Jan. 5, 1995

[30] Foreign Application Priority Data

Jan. 5, 1994 [DE] Germany .......................... 44 00 151.7

[51] Int. Cl.⁶ ................................................. F16M 11/38
[52] U.S. Cl. ................. 248/171; 248/169; 248/188.6; 248/528
[58] Field of Search .................... 248/170, 171, 248/168, 169, 188.6, 528; 84/421

[56] References Cited

U.S. PATENT DOCUMENTS

| | | | |
|---|---|---|---|
| 2,188,237 | 1/1940 | Weaver | 248/168 |
| 4,406,437 | 9/1983 | Wright | 248/529 |
| 4,801,123 | 1/1989 | Lynch | 248/529 |
| 4,988,064 | 1/1991 | Hoshino | 248/170 |
| 5,165,635 | 11/1992 | Hoshino | 248/169 |

FOREIGN PATENT DOCUMENTS

| | | | |
|---|---|---|---|
| 560498 | 7/1958 | Canada | 248/528 |
| 0013948 | 1/1980 | European Pat. Off. . | |
| 9201094 | 1/1992 | Germany . | |

Primary Examiner—Karen J. Chotkowski
Assistant Examiner—Gwendolyn Wrenn
Attorney, Agent, or Firm—Friedrich Kueffner

[57] ABSTRACT

A stand or tripod for receiving and holding objects, particularly musical instruments and/or accessories includes a center shaft and adjustable legs which are slidably mounted on the center shaft, wherein at least one of the legs can be swung about the center shaft. The legs are connected to sleeves arranged at the bottom end and at the top end of the shaft, wherein each sleeve is composed of a pair of sleeve members which are concentrically nested into one another.

8 Claims, 4 Drawing Sheets

STAND

BACKGROUND OF THE INVENTION

1. Field of the Invention

The present invention relates to a stand or tripod for receiving and holding objects, particularly musical instruments and/or accessories. The stand or tripod includes a center shaft and adjustable legs which are slidably mounted on the center shaft, wherein at least one of the legs can be swung about the center shaft.

2. Description of the Related Art

A stand of the above-described type is known from DE 92 01 094.6 U1. The stand has legs which are adjustable independently of each other and are arranged slidably on the center shaft. The legs of the stand can be adjusted in such a way that an object placed on the stand can be held in a horizontal or plane position even when the stand is on uneven ground. In order to be able to place the stand on ground with different elevations or on platforms or steps having different planes, and in tight and narrow spaces, the legs of the stand can be extended, i.e., the legs can be more or less radially outwardly adjusted. By swinging at least one of the legs of the stand in a horizontal plane, it is possible, in addition to the above-mentioned adjustments, to achieve another degree of freedom which, by swinging the leg of the stand about the center shaft, makes it possible significantly to limit the surrounding circle required for placing the stand, so that the stand can be placed in tight spaces or in narrow areas, for example, immediately adjacent additional stands of this type. The swingable leg of the known stand is guided by means of two slidable sleeves which surround the preferably cylindrical shaft. To make it possible to swing the swingable leg and/or to adjust the inclination of the legs, it is necessary to loosen a locking means provided at each slidable sleeve by means of a tightening screw which includes a wing-like handle.

SUMMARY OF THE INVENTION

Therefore, it is the primary object of the present invention to provide a stand or tripod of the above-described type which is easier to handle and operate, particularly with respect to the adjustability of the legs.

In accordance with the present invention, the legs are connected to sleeves arranged at the bottom end and at the top end of the shaft, wherein each sleeve is composed of a pair of sleeve members which are concentrically nested into one another.

In accordance with a proposal of the present invention, the swingable leg is connected at the upper sleeve to the inner sleeve member and the other legs are connected to the outer sleeve member which concentrically surrounds the inner sleeve member; at the lower sleeve, the swingable leg is connected to the outer sleeve member and the other legs are connected to the inner sleeve member which is concentrically surrounded by the outer sleeve member. This concentric arrangement of the sleeve members makes it possible, by loosening merely one tightening screw, to adjust the inclination of the legs relative to the center shaft and to swing the swingable leg about the center shaft. This is because the concentric arrangement of the sleeve members makes it possible to secure the sleeve members of the upper sleeve simultaneously and together to the center shaft; as soon as the upper pair of sleeve members are tightened, any movements of the sleeve members of the lower sleeve are also prevented. On the other hand, after releasing the tightening screw, the upper sleeve can be moved upwardly or downwardly on the center shaft so as to adjust the inclination of the legs and/or the swingable leg can be swung about the center shaft.

In accordance with a preferred feature of the present invention, bushings are arranged between the sleeves and the center shaft. The bushings are preferably of plastics material. Polyamide or similar hard and resilient materials are suitable for the bushings. The bushings not only contribute to the low wear of the displaceable and swingable mounting means for the legs, but they additionally transmit the tightening force applied by the tightening screw onto the center shaft.

In accordance with another feature, the bushings, particularly the bushing of the upper sleeve used for clamping, have axial slots which extend over a limited length. The axial slots extend from the top and/or from below up to about half the length of the bushing or slightly beyond half the length of the bushing. This improves the clamping capability because the axial slots increase the deformability of the bushing which changes its diameter and rests against the center shaft when the clamping force is applied.

In accordance with another proposal of the invention, the bushing of the lower sleeve is fixedly pressed to the shaft and the inner sleeve member, so that the outer sleeve member of the lower sleeve and the swingable leg can be rotated on the stationary inner sleeve of the other legs of the stand, while the lower sleeve is stationary and, consequently, any changes in the inclination of the legs can be effected by moving the upper sleeve toward or away from the lower sleeve. However, the lower bushing is not pressed onto the center shaft if the stand is used as a hi-hat stand which at the base thereof is equipped with a swingable foot pedal.

In accordance with a proposed feature, the bushing has over a partial middle section a raised portion, such as ribs, outer beads, etc. This makes it possible to achieve a kind of dowel-effect which additionally serves to secure the non-rotatable inner sleeve member of the lower sleeve to the center shaft.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 7b is a sectional view of the bushing of FIG. 7a taken along sectional line VII—VII of FIG. 7a.

DETAILED DESCRIPTION OF THE PREFERRED EMBODIMENTS

Figure 1:
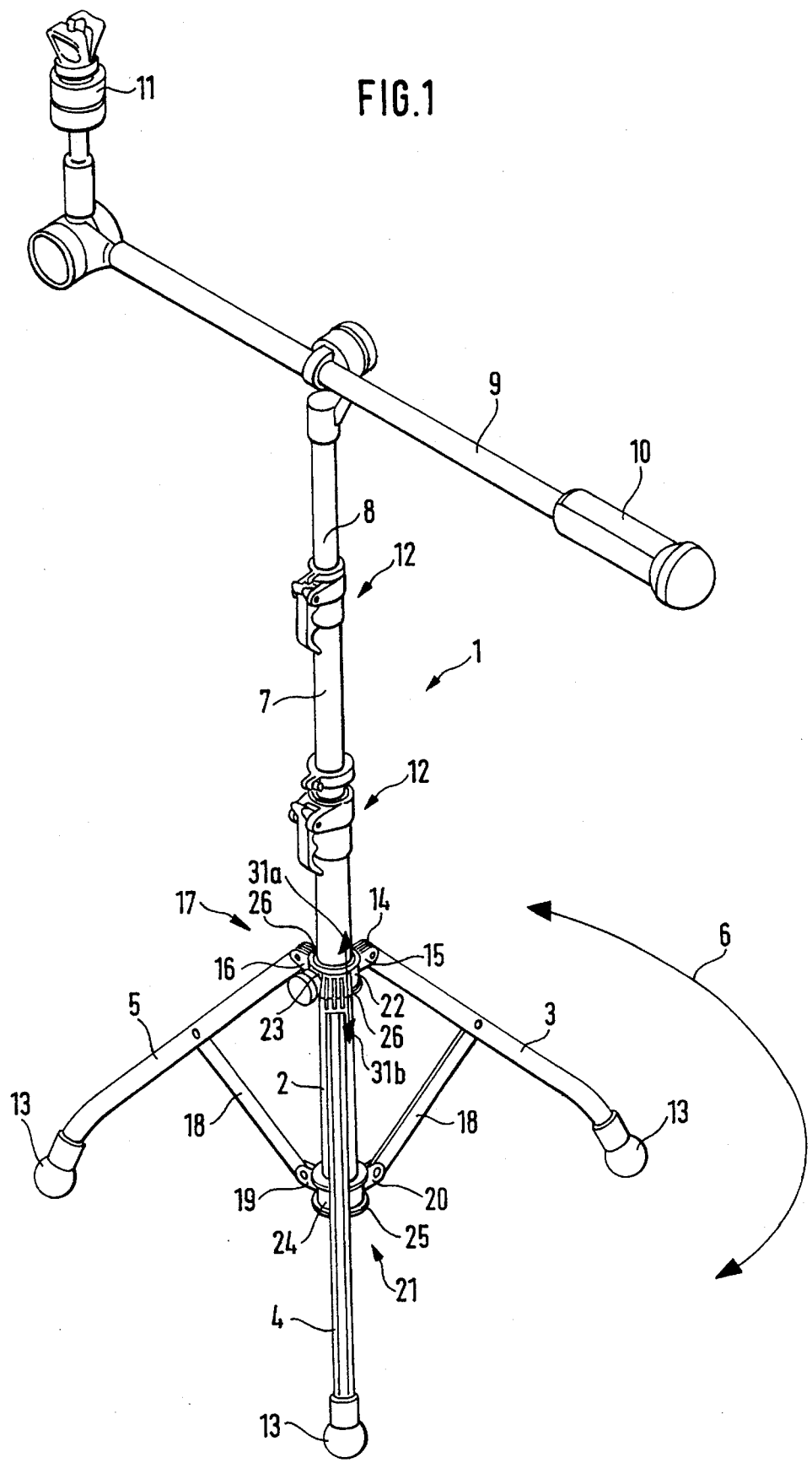
FIG. 1 is a perspective view of a stand having a swingable leg.
Figure 2:
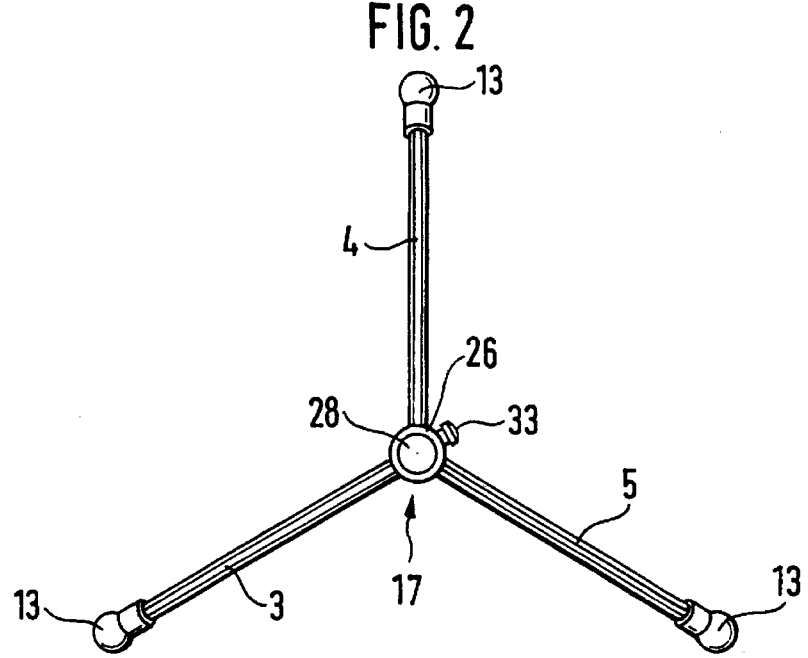
FIG. 2 is a sectional view of the stand of FIG. 1 taken along sectional line II—II.
Figure 3:
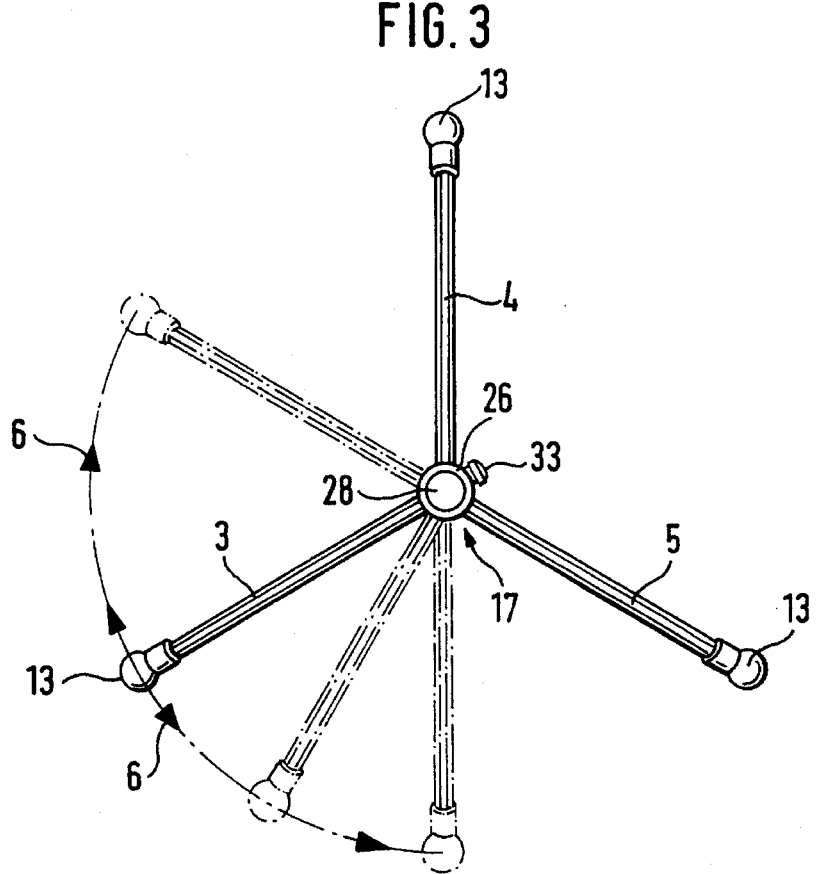
FIG. 3 is a sectional view, similar to FIG. 2, showing, in dash-dot lines, intermediate positions of the swingable leg of the stand.
Figure 4:
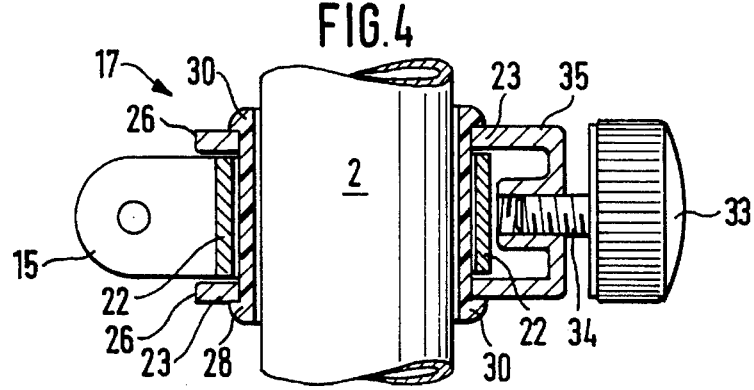
FIG. 4 is a sectional view, on a larger scale of the upper sleeve which is slidably mounted on the center shaft.

AS illustrated in FIG. 1 of the drawing, a stand 1 has a center shaft 2 and three legs 3, 4 and 5 which are mounted so as to be slidable on the shaft 2 and so as to be radially inwardly and outwardly adjustable. As indicated by a double arrow 6, the leg 3 is swingable about the center shaft 2. The maximum end positions and an intermediate position of the leg 3 are shown in FIG. 3 is dash-dot lines. An intermediate shaft 7 is inserted in the center shaft 2 and an upper shaft 8 is inserted in the intermediate shaft 7. The upper shaft 8 supports a cantilever arm 9 which on one end has a counterweight 10 and at the other end a receiving means 11 for a component to be mounted. The telescoping shafts 2, 7 and 8 can be secured in a desired vertical position by means of clamping devices 12.

Figure 6:
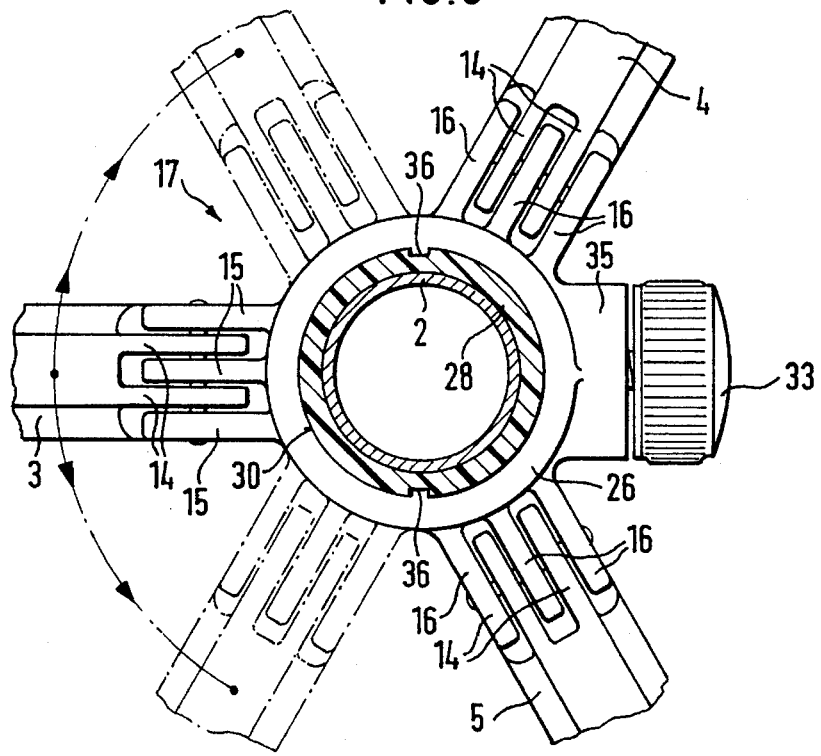
FIG. 6 is a top view, on a larger scale, of the stand shown in FIGS. 2 and 3.

At their ends facing away from the base 13, the legs 3, 4 and 5 are equipped with double lugs 14, as shown in FIG. 6, which are in engagement with parallel webs 15 or 16 of an upper sleeve 17 for an articulated connection of the legs 3, 4 and 5, as shown in FIG. 1. Levers 18 are connected to each leg 3, 4 and 5 approximately at the middle of each leg. The other ends of the levers 18 engage for an articulated connection between pairs of parallel webs 19 or 20 of a lower sleeve 21 of the center shaft 2, as shown in FIG. 1.

The sleeves 17 and 21 are each composed of concentrically nested sleeve members 22, 23 and 24, 25, respectively. The swingable leg 3 is connected to the inner sleeve member 22 of the upper sleeve 17 which is rotatable within the outer sleeve member 23 and, through the lever 18, the swingable leg 3 is connected to the outer sleeve member 25 of the sleeve 21 which is rotatable about the inner sleeve member 24. The connection is effected by means of parallel webs 16 or the pair of parallel webs 20. On the other hand, the two other legs 4, 5 are connected in an articulated manner to the stationary outer sleeve member 23 of the upper sleeve 17 and the stationary inner sleeve member 24 of the lower sleeve 21. The walls of the outer sleeve members 23 and 25 have window-like cutouts, so that they engage in these areas over the inner sleeve members 22 and 24, respectively, with radial collars 26 and 27 from both sides. The window-like cutout of the stationary outer sleeve member 23 of the upper sleeve 17 extends over a circular arc of approximately 120° and the window-like cutout of the rotatable outer sleeve member 25 of the lower sleeve 21 extends almost over the entire circumference, wherein the radial collars 27 of the sleeve member 25 are essentially merely connected by a wall portion which includes the pair of parallel webs 17 for the lever 18 of the swingable leg 3.

Accordingly, the end positions of the swingable leg 3 are defined by the vertical limitations of the window-like cutouts of the rotatable outer sleeve member 23 of the upper sleeve 17 and the pair of parallel webs 20 of the inner sleeve member 24 of the lower sleeve 21. This is because a further rotation of the inner sleeve member 22 relative to the outer sleeve member 23 is excluded as soon as the parallel webs 15 which receive the double lug 14 arranged in a cantilevering manner on the inner sleeve member 22 of the upper sleeve 17 make contact with the vertical limitations of the window-like cutout of the outer sleeve member 23. A further rotation of the outer sleeve member 25 relative to the inner sleeve member 24 is excluded as soon as the remaining wall of the outer sleeve member 25 of the lower sleeve 21 which has the projecting pair of parallel webs 20 for the swingable leg 3 makes contact with the pair of parallel webs 20 which are located in the direction of rotation and project from the inner sleeve member 24 of the lower sleeve 21.

Figure 5:
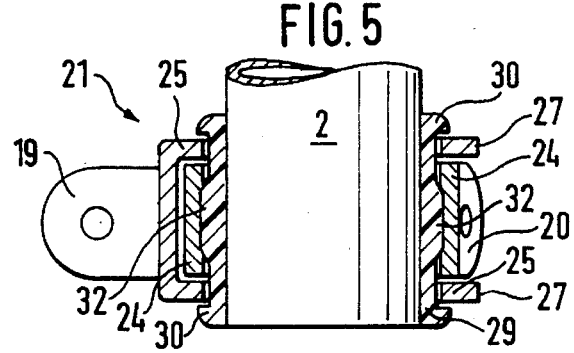
FIG. 5 is a sectional view of the lower sleeve of the stand of FIG. 1.
Figure 7A:
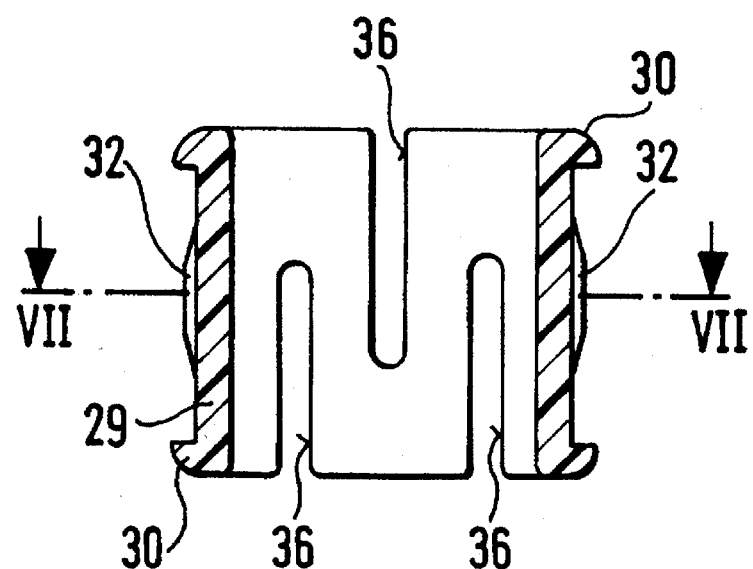
FIG. 7a is a longitudinally sectional view of a plastic bushing.
Figure 7B:
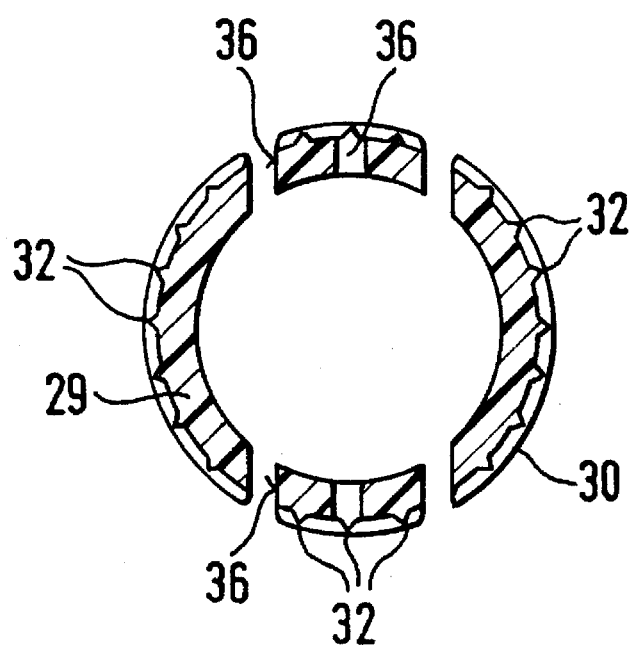

Bushings 28 and 29 of plastics material are arranged between the inner sleeve members 22 and 24 of the sleeves 17 and 21, respectively, and the center shaft 2. The bushings 28 and 29 slightly engage from both sides with a radial outer collar 30, respectively, over the outer sleeve members 23 and 25. While the upper bushing 28 and, thus, the upper sleeve 17 can be displaced up and down on the center shaft 2 in the direction of the double arrow 31a, 31b shown in FIG. 1 in order to change the inclination of the legs 3, 4 and 5, the lower bushing 29 and, thus, the lower sleeve 21 are pressed onto the center shaft 2 so as to be non-displaceable. In addition, the bushing 29 has over a partial middle section raised portions 32 in the form of ribs, as shown in FIGS. 7a, 7b, and is additionally pressed fixedly together with the inner sleeve member 24, as is apparent from FIG. 5. The raised portions 32 may also be in the form of beads and may be arranged in circumferential direction. The raised portions 32 make it additionally possible to compensate for any diameter differences caused by manufacturing tolerances between the shaft 2 and the stationary inner sleeve member 24 of the lower sleeve 21.

In order to swing the swingable leg 3 about the center shaft 2 and/or to adjust the inclination of the legs 3, 4 and 5 by displacement on the center shaft 2 in the direction of arrows 31a, 31b, it is merely necessary to loosen a tightening screw 33 arranged on the upper sleeve 17 and screwed with its threaded bolt 34 into a thread of a projection 35 of the outer sleeve member 23 of the upper sleeve 17. After the tightening force has been eliminated, the desired axial and/or radial adjustments can be carried out. By screwing the tightening screw 33 into the projection 35, the threaded bolt 34 rests against the inner sleeve member 22 and, as a result, the tightening force is transmitted to the bushing 28 whose diameter and cross section is changed and is tightly placed against the center shaft 2 so as to prevent further adjustments.

The deformability of the bushing 28 is obtained by axial slots 36, shown in FIG. 6. As shown in FIGS. 7a and 7b in the case of bushing 29, the axial slots 36 extend from the top and/or from below over a limited partial length in axial direction. In other words, the bushing 28 is not divided by the axial slots.

The invention is not limited by the embodiments described above which are presented as examples only but can be modified in various ways within the scope of protection defined by the appended patent claims.

We claim:

1. A stand for receiving and holding objects, particularly musical instruments and/or accessories, the stand comprising a center shaft and adjustable legs slidably mounted on the center shaft, wherein at least one of the legs is mounted so as to be swingable about the center shaft, the center shaft having a top and a bottom, further comprising a top sleeve at the top of the shaft and a bottom sleeve at the bottom of the shaft, each leg being connected to the top sleeve and the bottom sleeve, each sleeve comprising a pair of sleeve members which are concentrically nested into one another.

2. The stand according to claim 1, wherein each pair of sleeve members comprises an inner sleeve member and an outer sleeve member, and wherein the swingable leg is hinged to the inner sleeve member of the top sleeve and to the outer sleeve member of the bottom sleeve.

3. The stand according to claim 2, wherein the outer sleeve member of the top sleeve and the inner sleeve member of the bottom sleeve are stationary, and wherein the other legs are hinged to the outer sleeve member of the top sleeve and to the inner sleeve member of the bottom sleeve.

4. The stand according to claim 1, comprising bushings mounted between the top sleeve and the center shaft and the bottom sleeve and the center shaft.

5. The stand according to claim 4, wherein each bushing is of plastics material.

6. The stand according to claim 4, wherein the bushing between the top sleeve and the center shaft has axial slots extending over a limited length.

7. The stand according to claim 4, wherein the bushing between the bottom sleeve and the center shaft includes means for is tightly pressing said bushing together with the center shaft and the inner sleeve member of the bottom sleeve.

8. The stand according to claim 7, wherein the bushing between the bottom sleeve and the center shaft has a partial middle section, the partial middle section having a raised portion.

* * * * *